June 30, 1931.   G. F. MICHAEL   1,812,011

BRAKE OPERATING MEANS

Filed March 25, 1929

INVENTOR.
GUS F. MICHAEL
BY
Jn. W. McConkey
ATTORNEY

Patented June 30, 1931

1,812,011

UNITED STATES PATENT OFFICE

GUS F. MICHAEL, OF SOUTH BEND, INDIANA, ASSIGNOR TO BENDIX BRAKE COMPANY, OF SOUTH BEND, INDIANA, A CORPORATION OF ILLINOIS

BRAKE OPERATING MEANS

Application filed March 25, 1929. Serial No. 349,677.

This invention relates to brakes, and is illustrated as embodied in novel operating means for a brake on a front automobile wheel. An object of the invention is to provide a simplified and rugged support of the chassis end of the shaft of a Perrot-type front brake control, preferably by securing to the chassis frame a bracket having vertically swiveled thereon a support carrying the end of the shaft.

The above and other objects and features of the invention, including various novel and desirable details of construction, will be apparent from the following description of the illustrative embodiments shown in the accompanying drawings, in which.

Figure 1:
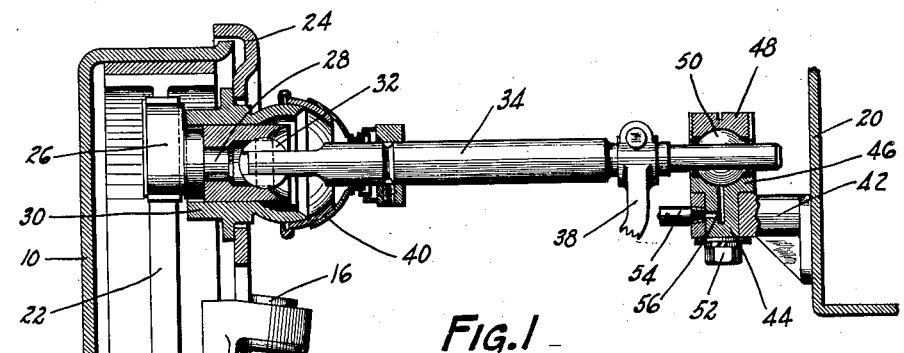
Figure 1 is a vertical section showing part of a left front automobile brake and its control, including one embodiment of my invention.

In the arrangements illustrated, the brake includes a drum 10, rotating with a wheel (not shown) mounted on the spindle 12 of a knuckle 14 swiveled by a king pin 16 or the like to an axle 18 supporting, by means of the usual springs (not shown) a chassis frame 20. The friction means of the brake may include suitable shoes 22 carried by means such as a backing plate 24 bolted to knuckle 14, and operated by a device shown as a cam 26 having a shaft part 28 journaled in a bracket 30 mounted on the backing plate and connected by a suitable universal joint 32 in line with the king pin to a shaft 34 (Figure 1) or a shaft section 36 (Figures 2 and 4) having an operating arm 38. Joint 32 may be inclosed in a suitable housing 40 which is preferably packed with a lubricant.

The present invention relates to the means for supporting the chassis end of shaft 34 or 36. In Figure 1 there is a bracket 42 bolted or otherwise secured to the chassis frame 20, and formed with a vertically-disposed bearing in which is journaled the spindle 44 of a support 46 having a head engaging the top of bracket 42 and formed as a half-socket cooperating with a half-socket 48 threaded into the upper hollow portion of the support to form a spherical socket embracing a perforated ball 50 slidably and rotatably receiving the reduced end of shaft 34. Spindle 44 is shown arranged with its axis vertically paralleling the side of the chassis frame, and has a nut 52 threaded on its end to hold the support in its bearing in bracket 42. A lubricant fitting 54 communicates by passage 56 with the interior of the socket holding the ball 50.

Figure 2:
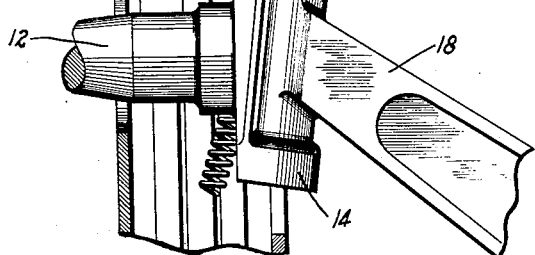
Figure 2 is a partial horizontal section through another modification, in which a telescoping control shaft is used.
Figure 3:
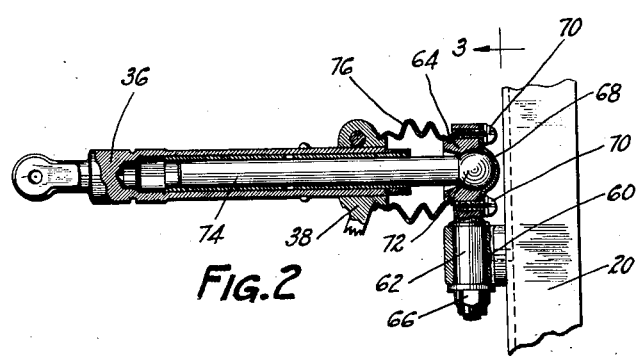
Figure 3 is a section on the line 3—3 of Figure 2, and showing the shaft support in elevation.

In Figures 2 and 3, a bracket 60 bolted to the chassis frame 20 has a bearing with its axis horizontally paralleling the side of the chassis frame and receiving the spindle 62 of a support 64 held by a nut 66. The upper end of support 64 is formed as a partial socket, cooperating with a stamping or cap 68 held by means such as screws 70 to embrace the ball end 72 of a shaft section 74 universally carried by the support and on which the shaft section 36 is slidably telescoped. The joint between the two shaft sections may be housed in a rubber or leather boot 76.

Figure 4:
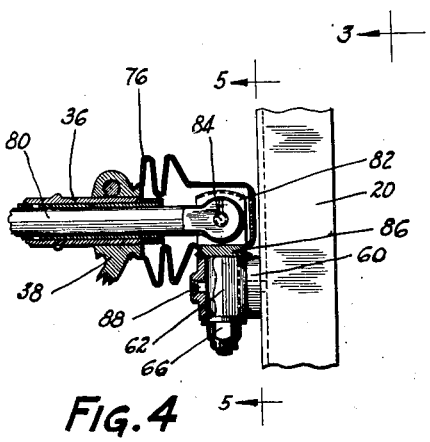
Figure 4 is a section corresponding to part of Figure 2, but showing a different embodiment of the invention.
Figure 5:
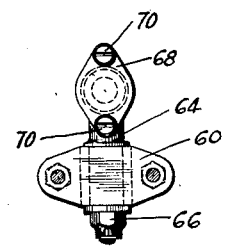
Figure 5 is a section corresponding to Figure 3, but showing the support of Figure 4.

The arrangement of Figures 4 and 5 differs from the one just described in that the shaft section 80, corresponding to section 74, has its end flattened and pivoted in a yoke 82 by means of a vertical pin 84. The yoke 82 forms part of a support 86 corresponding to support 64 and mounted in the same manner. A threaded passage 88 may be provided, in which a lubricant fitting 54 may be inserted if desired.

While several illustrative embodiments have been described in detail it is not my intention to limit the scope of the invention to those particular embodiments, or otherwise than by the terms of the appended claims.

I claim:

1. A control for a front automobile brake comprising, a bracket mounted on the chassis frame, a support swiveled on the bracket, and a shaft rotatably and universally supported at one end by the swiveled support.

2. A control for a front automobile brake comprising, a bracket adapted to be mounted on the chassis frame, a support swiveled on the bracket, and a shaft rotatably supported at one end by the swiveled support providing for movement at angles to the axis of said support.

3. A control for a front automobile brake comprising, a bracket adapted to be mounted on the chassis frame a bearing in the bracket paralleling the frame, a support swiveled in said bearing having a socket, a perforated ball movably mounted in said support, and a shaft rotatably and slidably journaled in said ball.

4. A brake control comprising a bracket, a member swiveled on the bracket having a socket, a ball positioned for movement in the socket having a diametral bore and a shaft positioned for rotation in the bore.

5. A brake control comprising a bracket, a support swiveled on the bracket, said support having a socket, a sleeve on the support, said sleeve having registering openings, a ball positioned for movement in the socket, said ball having a diametral bore, a member threaded in the sleeve engaging the ball, a shaft extending through the openings in the sleeve and the bore in the ball, said shaft having rotatably and angular movement.

In testimony whereof, I have hereunto signed my name.

GUS F. MICHAEL.